US007565027B2

(12) United States Patent
Mantell (10) Patent No.: US 7,565,027 B2
(45) Date of Patent: Jul. 21, 2009

(54) COUNTDOWN STAMP ERROR DIFFUSION

(75) Inventor: David Allen Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 665 days.

(21) Appl. No.: 11/246,626

(22) Filed: Oct. 7, 2005

(65) Prior Publication Data

US 2007/0081738 A1    Apr. 12, 2007

(51) Int. Cl.
G06K 9/00 (2006.01)
G06K 9/40 (2006.01)
G06K 9/38 (2006.01)
G06K 15/00 (2006.01)
H04N 1/405 (2006.01)

(52) U.S. Cl. .................. 382/274; 382/252; 382/254; 382/270; 358/3.03; 358/3.06

(58) Field of Classification Search .................. 382/274
See application file for complete search history.

(56) References Cited

U.S. PATENT DOCUMENTS

| 5,226,094 | A | | 7/1993 | Eschbach | |
|---|---|---|---|---|---|
| 5,353,127 | A | | 10/1994 | Shiau et al. | |
| 5,374,997 | A | | 12/1994 | Eschbach | |
| 5,422,742 | A | * | 6/1995 | Ostromoukhov et al. | 358/536 |
| 5,535,019 | A | | 7/1996 | Eschbach | |
| 5,565,994 | A | * | 10/1996 | Eschbach | 358/3.03 |
| 5,748,785 | A | * | 5/1998 | Mantell et al. | 382/237 |
| 5,784,496 | A | * | 7/1998 | Mantell | 382/237 |
| 6,325,487 | B1 | * | 12/2001 | Mantell | 347/41 |
| 6,987,536 | B2 | * | 1/2006 | Olding et al. | 348/297 |
| 7,057,773 | B2 | * | 6/2006 | Ilbery | 358/3.05 |
| 7,181,087 | B2 | * | 2/2007 | Kang et al. | 382/270 |
| 7,317,556 | B2 | * | 1/2008 | Mantell | 358/3.03 |
| 7,362,911 | B1 | * | 4/2008 | Frank | 382/260 |
| 2003/0081842 | A1 | * | 5/2003 | Buckley | 382/233 |
| 2005/0134921 | A1 | * | 6/2005 | Mantell | 358/3.03 |
| 2006/0245000 | A1 | * | 11/2006 | Choi et al. | 358/3.03 |
| 2007/0002381 | A1 | * | 1/2007 | Metcalfe et al. | 358/3.03 |
| 2007/0081738 | A1 | * | 4/2007 | Mantell | 382/274 |
| 2007/0258625 | A1 | * | 11/2007 | Mirtsching | 382/110 |

OTHER PUBLICATIONS

Ostromoukhov, Victor, "A simple and efficient error-diffusion algorithm", 2001, "International Conference on Computer Graphics and Interactive Techniques Proceedings of the 28th annual conference on Computer graphics and interactive techniques" p. 567-572.*
Robert W. Floyd et al., "An Adaptive Algorithm for Spatial Greyscale", 3 pp.
Levien, "Output Dependent Feedback In Error Diffusion Halftoning", IS&T's 46th Annual Conference.

* cited by examiner

Primary Examiner—Bhavesh M Mehta
Assistant Examiner—Gandhi Thirugnanam
(74) Attorney, Agent, or Firm—Pepper Hamilton LLP (57) ABSTRACT

Methods and systems for performing threshold stamping are disclosed. A pixel intensity value for a first pixel may be determined. A pixel value for the first pixel may be retrieved from a memory location corresponding to the first pixel. A threshold delta value may then be determined based on the pixel value and added to a base threshold value to produce a threshold value. If the pixel intensity value exceeds the threshold value, a plurality of pixel values corresponding to a plurality of pixels may be updated. The plurality of pixels may include the first pixel and one or more second pixels. Otherwise, the pixel value for the first pixel may be updated.

15 Claims, 11 Drawing Sheets

| y \ x | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
|  | 23 | 24 | 25 | 26 | 27 | 28 | 29 | 30 | 31 | 30 | 29 | 28 | 27 | 26 | 25 | 24 | 23 | 22 | 21 | 20 | 19 |
|  | 22 | 23 | 24 | 25 | 26 | 27 | 28 | 29 | 30 | 29 | 28 | 27 | 26 | 25 | 24 | 23 | 22 | 21 | 20 | 19 | 18 |
|  | 21 | 22 | 23 | 24 | 25 | 26 | 27 | 28 | 29 | 28 | 27 | 26 | 25 | 24 | 23 | 22 | 21 | 20 | 19 | 18 | 17 |
| 4 | 20 | 21 | 22 | 23 | 24 | 25 | 26 | 27 | 28 | 27 | 26 | 25 | 24 | 23 | 22 | 21 | 20 | 19 | 18 | 17 | 16 |
|  | 19 | 20 | 21 | 22 | 23 | 24 | 25 | 26 | 27 | 26 | 25 | 24 | 23 | 22 | 21 | 20 | 19 | 18 | 17 | 16 | 15 |
|  | 18 | 19 | 20 | 21 | 22 | 23 | 24 | 25 | 26 | 25 | 24 | 23 | 22 | 21 | 20 | 19 | 18 | 17 | 16 | 15 | 14 |
|  | 17 | 18 | 19 | 20 | 21 | 22 | 23 | 24 | 25 | 24 | 23 | 22 | 21 | 20 | 19 | 18 | 17 | 16 | 15 | 14 | 13 |
| 8 | 16 | 17 | 18 | 19 | 20 | 21 | 22 | 23 | 24 | 23 | 22 | 21 | 20 | 19 | 18 | 17 | 16 | 15 | 14 | 13 | 12 |
|  | 15 | 16 | 17 | 18 | 19 | 20 | 21 | 22 | 23 | 22 | 21 | 20 | 19 | 18 | 17 | 16 | 15 | 14 | 13 | 12 | 11 |
|  | 14 | 15 | 16 | 17 | 18 | 19 | 20 | 21 | 22 | 21 | 20 | 19 | 18 | 17 | 16 | 15 | 14 | 13 | 12 | 11 | 10 |
|  | 13 | 14 | 15 | 16 | 17 | 18 | 19 | 20 | 21 | 20 | 19 | 18 | 17 | 16 | 15 | 14 | 13 | 12 | 11 | 10 | 9 |
| 12 | 12 | 13 | 14 | 15 | 16 | 17 | 18 | 19 | 20 | 20 | 21 | 22 | 23 | 24 | 25 | 26 | 27 | 28 | 29 | 30 | 31 |
|  | 11 | 12 | 13 | 14 | 15 | 16 | 17 | 18 | 19 | 19 | 20 | 21 | 22 | 23 | 24 | 25 | 26 | 27 | 28 | 29 | 30 |
|  | 10 | 11 | 12 | 13 | 14 | 15 | 16 | 17 | 18 | 18 | 19 | 20 | 21 | 22 | 23 | 24 | 25 | 26 | 27 | 28 | 29 |
|  | 9 | 10 | 11 | 12 | 13 | 14 | 15 | 16 | 17 | 17 | 18 | 19 | 20 | 21 | 22 | 23 | 24 | 25 | 26 | 27 | 28 |
| 16 | 8 | 9 | 10 | 11 | 12 | 13 | 14 | 15 | 16 | 16 | 17 | 18 | 19 | 20 | 21 | 22 | 23 | 24 | 25 | 26 | 27 |
|  | 7 | 8 | 9 | 10 | 11 | 12 | 13 | 14 | 15 | 15 | 16 | 17 | 18 | 19 | 20 | 21 | 22 | 23 | 24 | 25 | 26 |
|  | 17 | 18 | 19 | 20 | 21 | 22 | 23 | 24 | 25 | 26 | 27 | 28 | 29 | 30 | 31 | 30 | 29 | 28 | 27 | 26 | 25 |
|  | 16 | 17 | 18 | 19 | 20 | 21 | 22 | 23 | 24 | 25 | 26 | 27 | 28 | 29 | 30 | 29 | 28 | 27 | 26 | 25 | 24 |
| 20 | 15 | 16 | 17 | 18 | 19 | 20 | 21 | 22 | 23 | 24 | 25 | 26 | 27 | 28 | 29 | 28 | 27 | 26 | 25 | 24 | 23 |
|  | 14 | 15 | 16 | 17 | 18 | 19 | 20 | 21 | 22 | 23 | 24 | 25 | 26 | 27 | 28 | 27 | 26 | 25 | 24 | 23 | 22 |
|  | 13 | 14 | 15 | 16 | 17 | 18 | 19 | 20 | 21 | 22 | 23 | 24 | 25 | 26 | 27 | 26 | 25 | 24 | 23 | 22 | 21 |
|  | 12 | 13 | 14 | 15 | 16 | 17 | 18 | 19 | 20 | 21 | 22 | 23 | 24 | 25 | 26 | 25 | 24 | 23 | 22 | 21 | 20 |
| 24 | 11 | 12 | 13 | 14 | 15 | 16 | 17 | 18 | 19 | 20 | 21 | 22 | 23 | 24 | 25 | 24 | 23 | 22 | 21 | 20 | 19 |
|  | 10 | 11 | 12 | 13 | 14 | 15 | 16 | 17 | 18 | 19 | 20 | 21 | 22 | 23 | 24 | 23 | 22 | 21 | 20 | 19 | 18 |
|  | 9 | 10 | 11 | 12 | 13 | 14 | 15 | 16 | 17 | 18 | 19 | 20 | 21 | 22 | 23 | 22 | 21 | 20 | 19 | 18 | 17 |
|  | 8 | 9 | 10 | 11 | 12 | 13 | 14 | 15 | 16 | 17 | 18 | 19 | 20 | 21 | 22 | 21 | 20 | 19 | 18 | 17 | 16 |
| 28 | 7 | 8 | 9 | 10 | 11 | 12 | 13 | 14 | 15 | 16 | 17 | 18 | 19 | 20 | 21 | 20 | 19 | 18 | 17 | 16 | 15 |

COUNTDOWN STAMP ERROR DIFFUSION

BACKGROUND

1. Technical Field

The disclosed embodiments generally relate to the field of image processing.

2. Description of the Related Art

Error diffusion methods, such as the method described in R. W. Floyd & L. Steinberg, "An Adaptive Algorithm for Spatial Grayscale," in the Proceedings of the Society for Information Display, vol. 17, pp 75-77 (1976) (the "Floyd-Steinberg method"), are often used to convert grayscale images to binary images on a binary output device. Such error diffusion methods typically examine a pixel in an input image, determine whether the intensity for the pixel in the input image exceeds a threshold, and assign either a light or dark binary value to the pixel in an output image based on whether the intensity exceeds the threshold. The difference between the input image pixel intensity and the corresponding pixel intensity in the output image is the error for the pixel. Error diffusion methods assign at least a portion of the error to one or more neighboring pixels that have not been previously assigned a pixel intensity for the output image. In this manner, the total pixel intensity is substantially maintained throughout the output image without a substantial loss of resolution. However, individual pixels might be lighter or darker in the resulting image than in the input image.

Figure 1A:
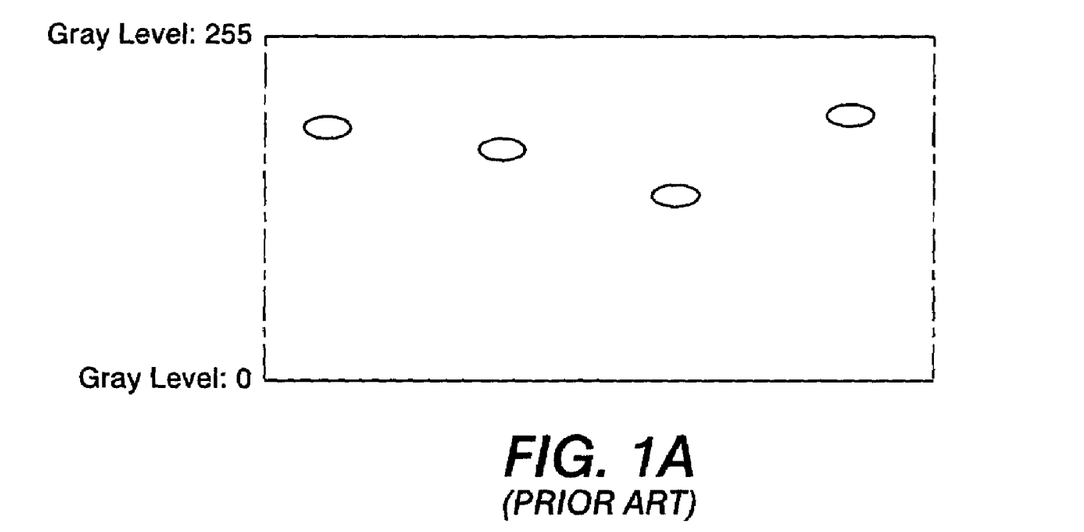
FIG. 1A depicts grayscale levels for neighboring pixels.

For example, FIG. 1A depicts grayscale values for neighboring pixels in an exemplary input image. Each pixel has a grayscale value within a range. In a computer embodiment having 8-bit color, a low value for the range is '0,' and a high value for the range is '255.'

Figure 1B:
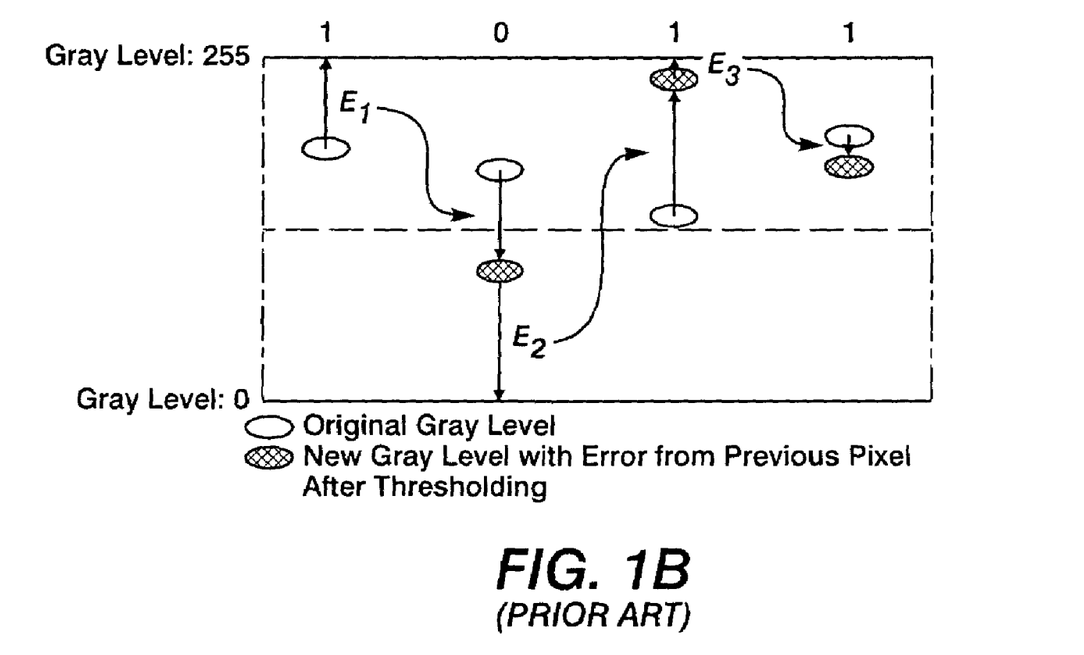
FIG. 1B depicts the resulting pixel values using a traditional method of calculating error diffusion.

FIG. 1B depicts the resulting light/dark values for the four pixels based on a traditional one-dimensional error diffusion method. In FIG. 1B, the threshold for the light/dark determination is the midpoint of the range (i.e., a grayscale value of 127.5). Since the first pixel has a grayscale value greater than the threshold, the pixel is assigned a value of '1' (e.g., "dark" or "black"). The difference between the original grayscale value for the first pixel and the resulting high value is defined to be the error value, $E_1$. In other words, the error is equal to the amount of compensation added to a pixel in order to force it to a '0' or '1' value.

For the second pixel, the error value $E_1$ is subtracted from the original value for the pixel. Since the resulting value is less than the threshold, the second pixel is assigned a value of '0' (e.g., "light" or "white"). The error value, $E_2$, is computed for the second pixel. The process iterates over each subsequent pixel until all pixels are computed. Alternate error diffusion methods might diffuse the calculated error among a plurality of unconverted pixels. For example, a first portion of the error value $E_1$ for the first pixel could be subtracted from the second pixel and a second portion could be subtracted from the third pixel.

Exemplary methods of using error diffusion to generate an output image include the methods described in U.S. Pat. Nos. 5,226,094 and 5,374,997 to Eschbach, the disclosures of which are each incorporated herein by reference in their entireties.

Figure 2:
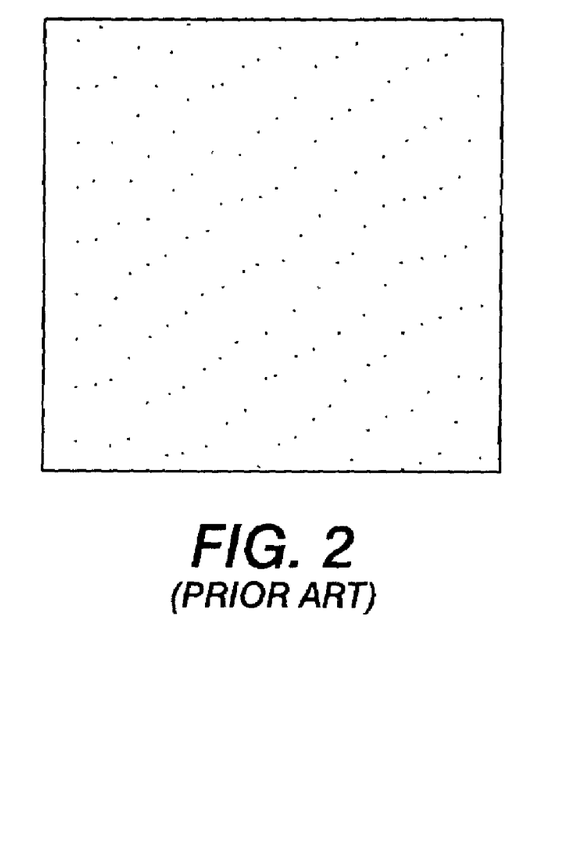
FIG. 2 depicts an exemplary error diffusion rendered binary output of a constant highlight black/K input level having worm effects.

One problem inherent in the Floyd-Steinberg method is that displeasing textures (i.e., worms) are produced in the highlight and shadow regions. An exemplary error diffusion rendered binary output having worm effects is shown in FIG. 2.

Figure 3:
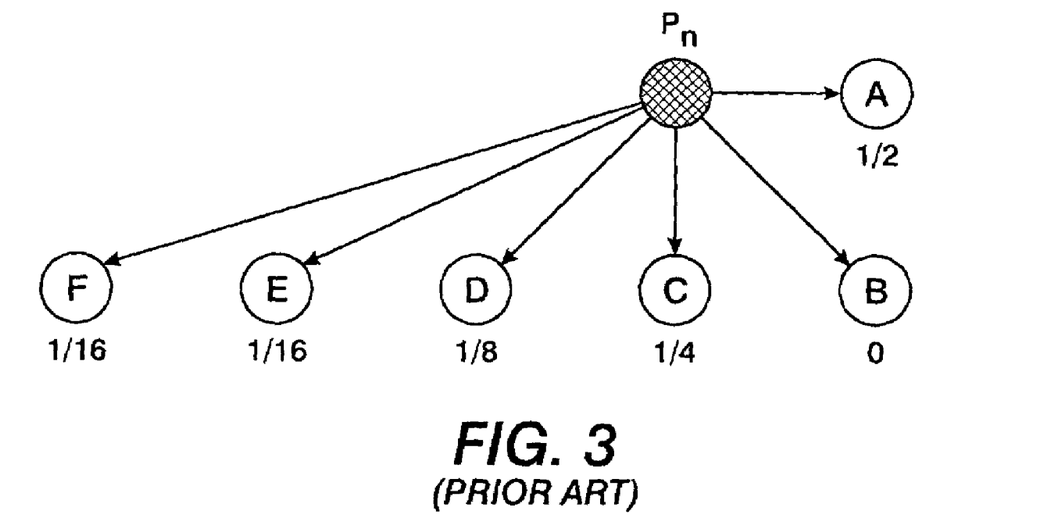
FIG. 3 depicts the error-diffusion weights and the destination pixels for a traditional method of calculating error diffusion.

Accordingly, modifications to the Floyd-Steinberg method, such as the one described in U.S. Pat. No. 5,353,127 to Shiau et al., which is incorporated herein by reference in its entirety, and shown in FIG. 3, have been developed to reduce this effect. The error diffusion weights (the "Shiau-Fan" or "anti-worm" coefficients) shown in FIG. 3 may be generated using simple bit-shifting techniques. As such, this error diffusion method allows for very fast calculations with limited circuitry.

A third error diffusion method, called "threshold stamping" and described in U.S. Pat. No. 5,535,019 to Eschbach, which is incorporated herein by reference in its entirety, modulates the error diffusion threshold level in order to adjust the dot placement in the extreme highlight and shadow regions. As such, the worm artifact is virtually eliminated. The stamping function uses a line-buffer of memory to store and adjust the slow-scan threshold video that is used to render the downstream pixels via error diffusion processing.

Figure 4:
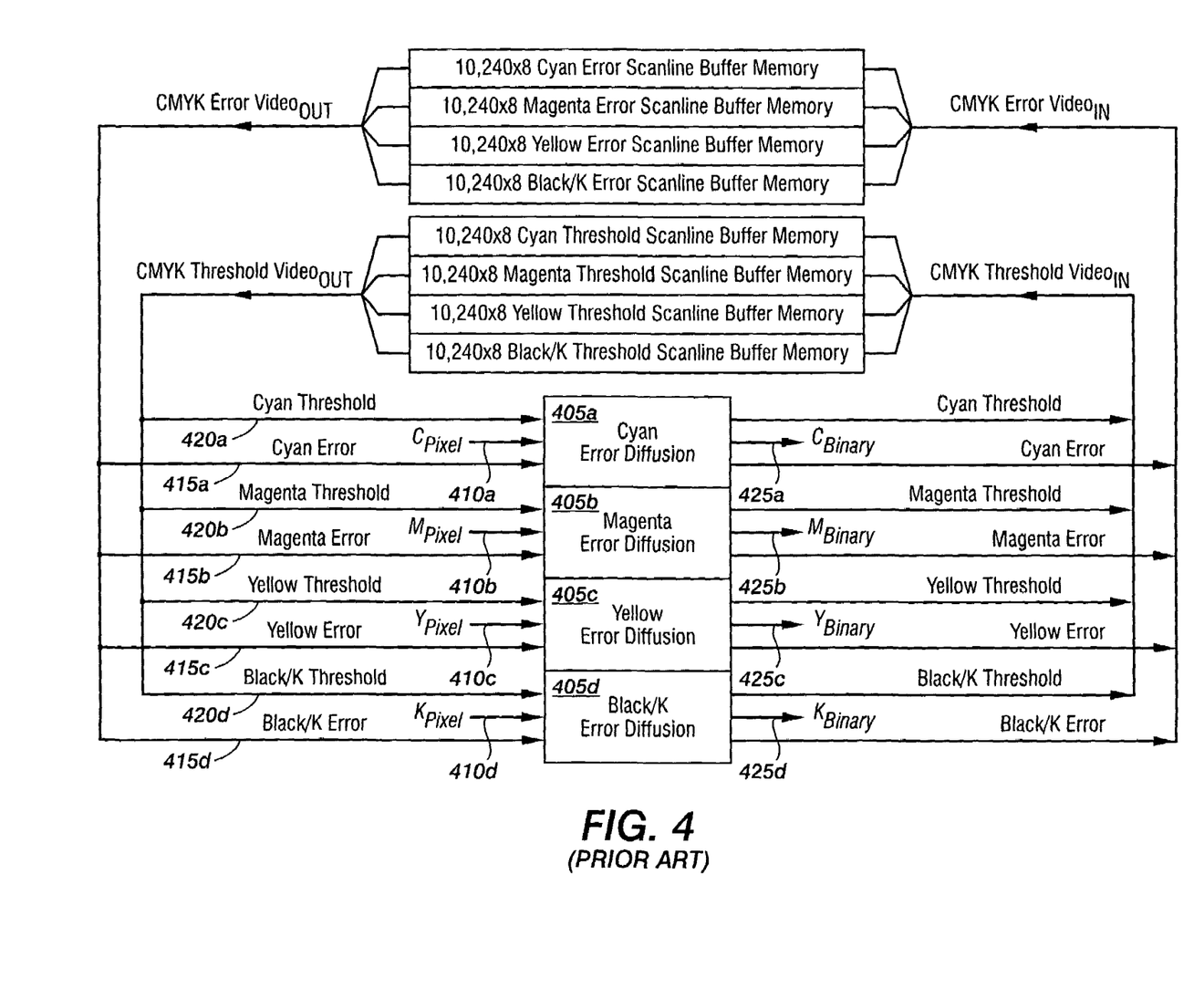
FIG. 4 depicts a block diagram of the main components of a traditional error diffusion color image-processing module with threshold stamping.

FIG. 4 depicts a block diagram of the main components of a traditional error diffusion color image-processing module with threshold stamping. Each error diffusion block 405a-d performs the threshold stamping and error diffusion algorithms for a particular color, such as cyan, magenta, yellow and black.

The error diffusion blocks 405a-d receive pixel information 410a-d corresponding to the color for each pixel on a scanline. The pixel information 410a-d is within a range, such as from 0 to 255, and represents the intensity of the particular color for the pixel in an input image.

The error diffusion blocks 405a-d also receive error information from the error scanline buffer memory 415a-d corresponding to the same color. Each error value is within a range, such as from −128 to 127, and represents the amount of error passed to the pixel from preceding pixels according to an error diffusion algorithm.

Moreover, the error diffusion blocks 405a-d receive threshold information from the threshold scanline buffer memory 420a-d corresponding to the same color. Each threshold value is within a range, such as from −128 to 127, and represents the change from the base threshold for the particular pixel.

The error diffusion blocks 405a-d determine whether the sum of the pixel value and the error value for a pixel is greater than the sum of the base threshold and the threshold value for the pixel. If the sum of the pixel value and the error value is greater, then the pixel is supplied with the designated color 425a-d. Otherwise, the pixel is not supplied with the designated color.

The error diffusion blocks 405a-d then compute updated error values based on the above comparison for a scanline and store the updated error values in the error scanline buffer memory 415a-d corresponding to the same color. Likewise, the error diffusion blocks 405a-d compute updated threshold values based on the above comparison for a scanline and store the updated threshold values in the error scanline buffer memory 420a-d corresponding to the same color. Accordingly, slow-scan error and threshold information is passed from preceding scanlines to subsequent scanlines using this process.

Figure 5:
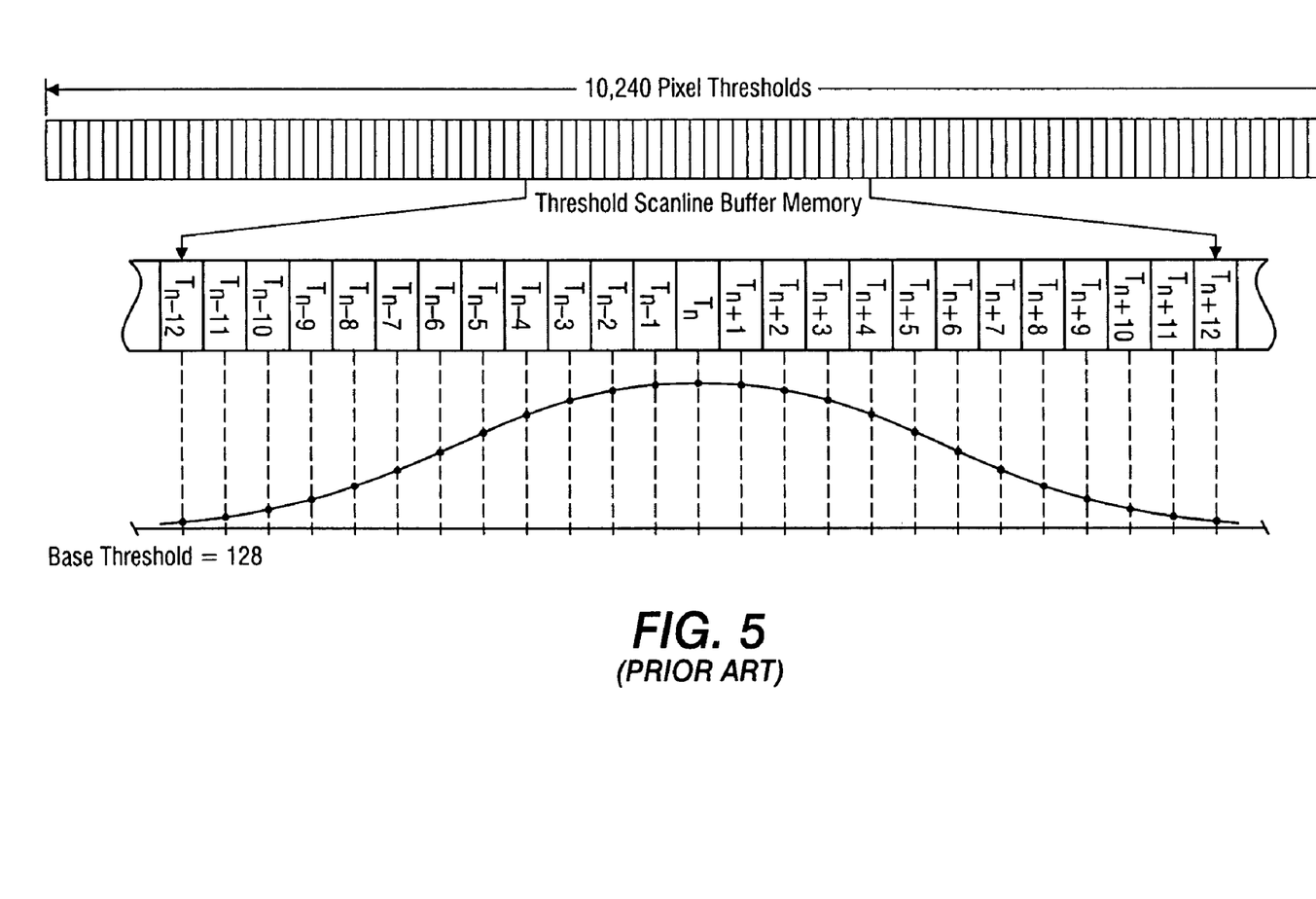
FIG. 5 depicts a traditional threshold stamping distribution profile that is added to the threshold buffer memory after stamping a "black" (or "dark" pixel).

FIG. 5 depicts a traditional threshold stamping distribution profile that is added to the threshold buffer memory after stamping a "black" (or "dark" pixel) in a light region. The magnitude of the threshold adjustment is typically largest at the central point ($T_N$) of pixel binarization and decays to zero several pixels away (for example, $T_{N+12}$ and $T_{N-12}$). As such, this has the desired effect of pushing subsequent printed dot(s) away from a printed dot while still maintaining the overall binary output level. The overall result of this processing shifts the dot placement of surrounding downstream pixels in the opposite direction of the "worm" response. As a result, a visually improved, uniform binary output is delivered. The distribution shown in FIG. 5 represents the effects of one stamped pixel. If multiple pixels are stamped, the threshold scanline buffer memory includes the sum of the threshold adjustments of each stamped pixel.

Figure 6:
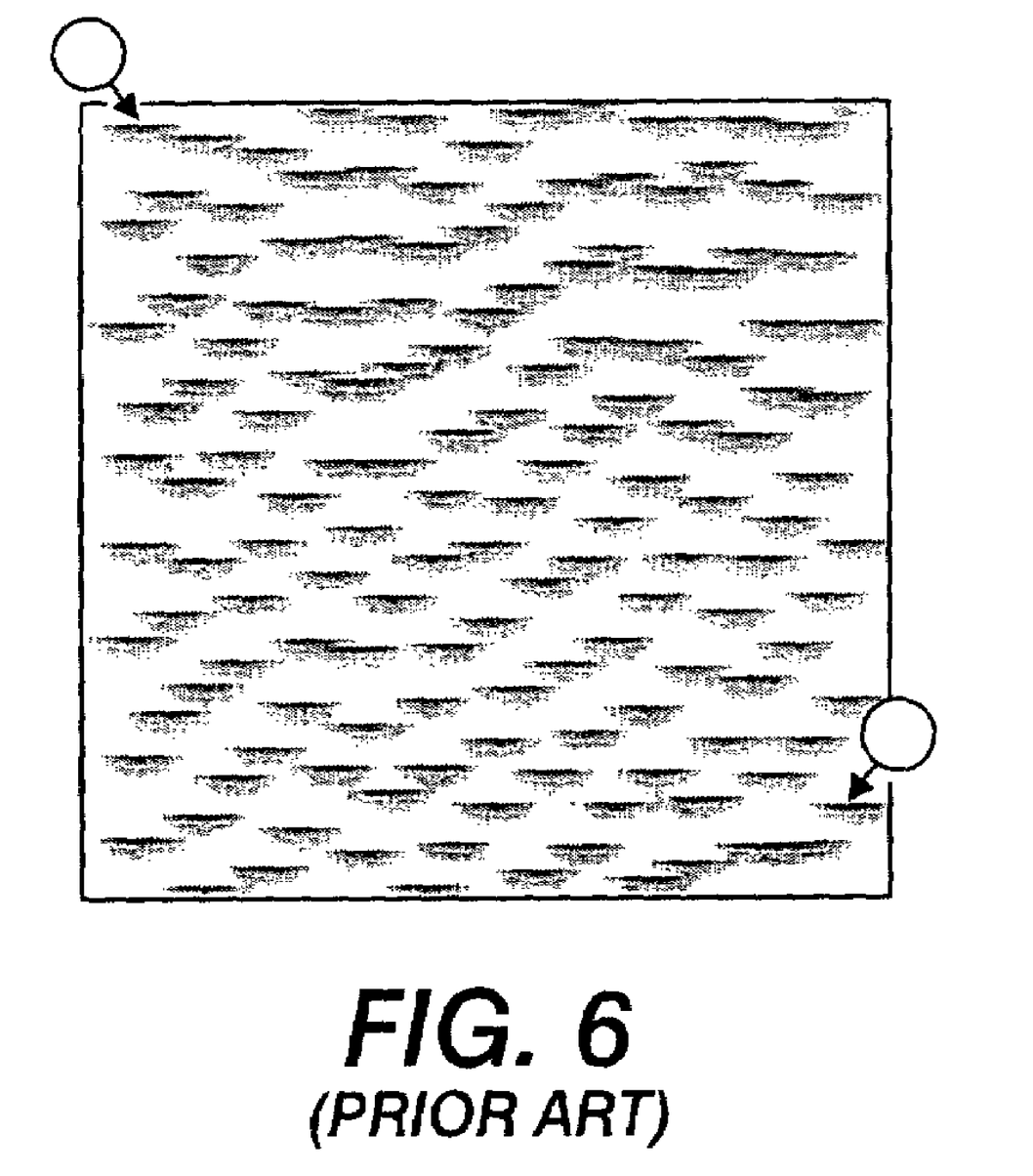
FIG. 6 depicts an error diffusion threshold delta image.

FIG. 6 depicts an error diffusion threshold delta image. The dark areas correspond to areas in which the threshold delta value is greater than zero for a highlight region. If the location is darker, then the threshold delta value is higher for that location. The slow-scan "decay" of the threshold delta is essential to rendering an adequate binary output dot structure since it is desired that any threshold adjustment only affect the dot-placement of localized "neighboring" pixels while leaving other areas unaffected.

Although threshold stamping improves image quality by improving the location of dots within light regions and holes within dark regions, it is computationally expensive and memory intensive in a number of respects. For example, a damping function is typically used to decay the stamped threshold in the slow path direction. The damping function multiplies the threshold for each bit by a constant. Such multiplication is computationally expensive. The damping function also requires that the threshold values start with a large value to ensure that the stamp effect persists over a sufficient number of lines. In addition, overlapping stamped pixel thresholds are summed, which provides an additional arithmetic operation for each step.

Figure 7:
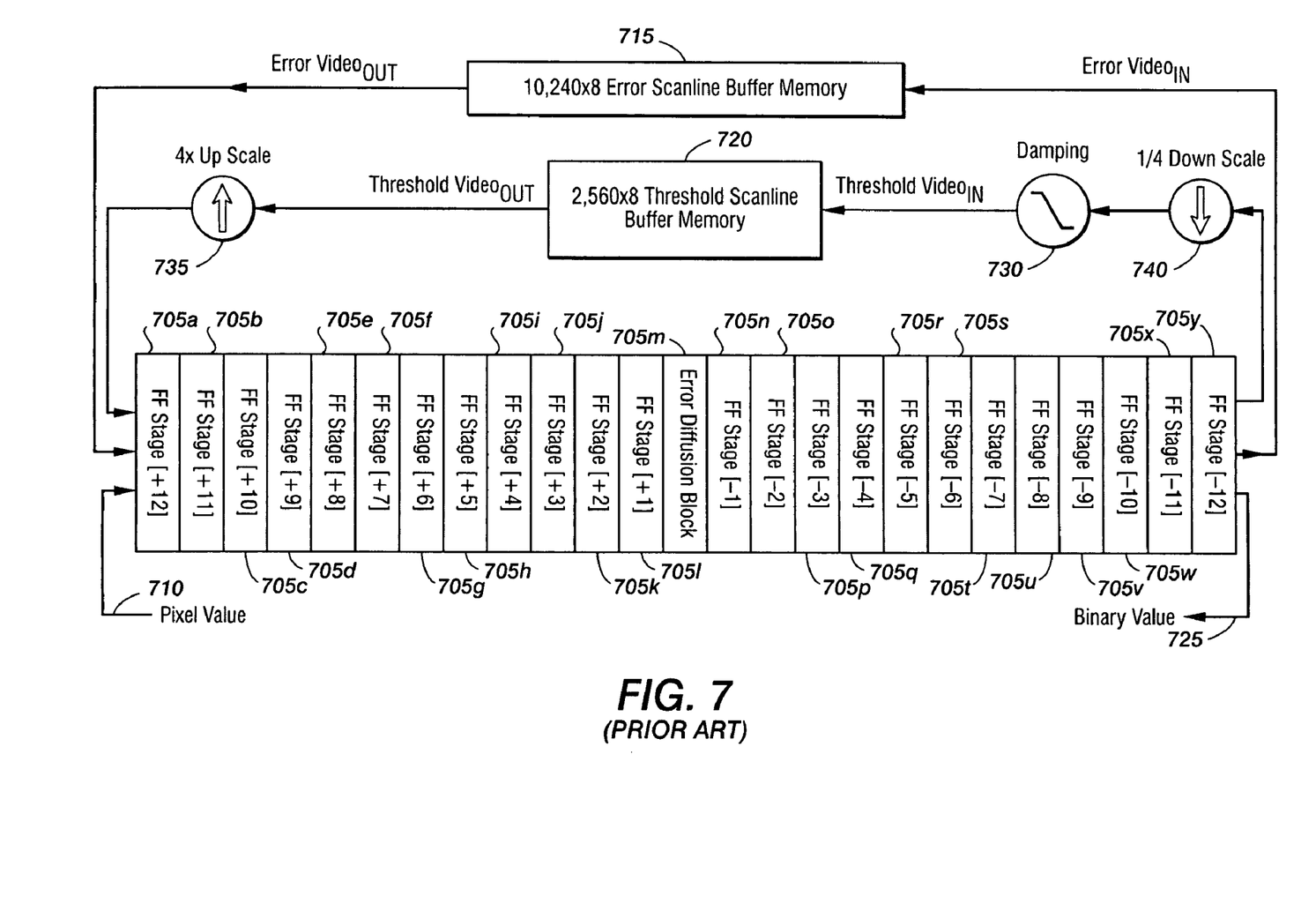
FIG. 7 depicts a traditional block diagram having a reduced threshold scanline buffer memory.

FIG. 7 depicts a block diagram having a reduced threshold scanline buffer memory. As shown in FIG. 7, the threshold stamping function is performed using a register array 705a-y. A majority of the threshold values for a scanline are stored within the threshold scanline buffer memory 720 at any given time. During pixel processing, threshold values are retrieved from the threshold scanline buffer memory 720 and stored within a series of register blocks in the register array 705a-y.

The register array 705a-y forms a "rolling-buffer" architecture in which information from previous scanlines is retrieved from the error scanline buffer memory 715 and the threshold scanline buffer memory 720, modified by an error diffusion algorithm and a threshold stamping algorithm applied within the register array 705a-y, decayed via the threshold damping circuit 730, and stored within the same memory locations. As such, the threshold and error data are updated for processing by, for example, subsequent scanlines.

The following description pertains to a single instance of an error diffusion algorithm and a threshold stamping algorithm in the register array 705a-y. In operation, FF[+12] 705a receives a pixel intensity value 710, which can be a value within a range from, for example, 0 to 255; an error value from the error scanline buffer memory 715, which can be a value within a range from, for example, −128 to 127; and a threshold value from the threshold scanline buffer memory 720, which can be a value within a range from, for example, −128 to 127. The pixel intensity value 710 represents the pixel intensity of a corresponding pixel in an input image. The error value represents the initial error assigned to the pixel according to an error diffusion algorithm. The threshold value represents a stored threshold value for the pixel based on preceding scanlines. FF[0] (i.e., the error diffusion block) 705m performs error diffusion for a particular pixel.

The size of the threshold scanline buffer memory 720 can be reduced by performing interpolation and extrapolation of the threshold values using threshold upscaling logic 735 and threshold downscaling logic 740. The threshold value may be received from the threshold upscaling logic 735, which may interpolate intermediate threshold values between threshold values stored in the threshold scanline buffer memory 720. Likewise, updated threshold values can be averaged and sampled using threshold downscaling logic 740.

The downscaled threshold value is passed to the threshold damping circuit 730. The threshold damping circuit 730 multiplies the updated threshold value by a value, such as a value between about 0 and about 1. If the resulting value is less than zero, the threshold damping circuit 730 sets the value to 0. The damped threshold value reduces the effect of the threshold delta value on a particular pixel position for each subsequent scanline.

Alternately, the threshold downscaling logic 740 and the threshold damping circuit 730 are combined into one circuit to reduce delay in calculating the damped threshold value.

The damped threshold value and the error value are stored in the same memory location within the threshold scanline buffer memory 720 and the error scanline buffer memory 715, respectively, from which they were originally retrieved. The values are used, for example, in the computation of the threshold and error values for the next scanline.

Because threshold values from overlapping pixel stamps can sum to large values and/or because the threshold values that are stamped typically have large values (such as 8 bits per pixel), the amount of memory required to store the thresholds for an entire scanline is large. As such, the memory required to implement stamping functions can be excessive for particular implementations.

What is needed is an error diffusion method and system that enables high-speed error diffusion while performing stamping.

A need exists for an error diffusion method and system that reduces the worm effects traditionally caused in highlight and shadow regions of an image.

A need exists for a method of reducing the number and/or complexity of computations performed during the stamping portion of an error diffusion process.

A further need exists for a method of reducing the memory size and number of memory accesses for an error diffusion algorithm while substantially maintaining image quality.

The present disclosure is directed to solving one or more of the above-listed problems.

SUMMARY

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "pixel" is a reference to one or more pixels and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention.

In an embodiment, an image processing device may include a processor, and a processor-readable storage medium. The processor-readable storage medium may contain one or more programming instructions for performing a method for processing an input image to form an output image. The input image includes a plurality of input pixels. Each input pixel includes an input pixel intensity value having a first number of possible levels. The output image includes a plurality of output pixels. Each output pixel includes an output pixel intensity value having a second number of possible levels. The method may include determining an input pixel intensity value for an input pixel, determining a threshold value based on at least the input pixel intensity value and a stored pixel value corresponding to the input pixel, determining an output pixel intensity value by comparing the input pixel intensity value with the threshold value, and modifying one or more stored pixel values based on at least the output pixel intensity level for the output pixel.

In an embodiment, a processor-readable storage medium may contain one or more programming instructions for performing a method for processing an input image to form an output image. The input image includes a plurality of input pixels. Each input pixel includes an input pixel intensity value having a first number of possible levels. The output image includes a plurality of output pixels. Each output pixel includes an output pixel intensity value having a second number of possible levels. The method may include determining an input pixel intensity value for an input pixel, determining a threshold value based on at least the input pixel intensity value and a stored pixel value corresponding to the input pixel, determining an output pixel intensity value by comparing the modified input pixel intensity value with the threshold value, and modifying one or more stored pixel values based on at least the output pixel intensity value for the output pixel.

In an embodiment, a processor-readable storage medium may contain one or more programming instructions for performing a method for processing an input image to form an output image. The input image includes a plurality of input pixels. Each input pixel includes an input pixel intensity value having a first number of possible levels. The output image includes a plurality of output pixels. Each output pixel includes an output pixel intensity value having a second number of possible levels. The method may include determining an input pixel intensity value for an input pixel, determining a threshold value based on at least the input pixel intensity value and a stored pixel value corresponding to the input pixel, determining an output pixel intensity value by comparing the input pixel intensity value to the threshold value, replacing the stored pixel value with a first value if the input pixel intensity value is greater than a first value and the output pixel intensity value is less than a second value, and replacing the stored pixel value with a second value if the input pixel intensity value is less than a third value and the output pixel intensity value is greater than a fourth value.

BRIEF DESCRIPTION OF THE DRAWINGS

Aspects, features, benefits and advantages of the embodiments described herein will be apparent with regard to the following description, appended claims and accompanying drawings where:

FIG. 9 depicts a table highlighting the behavior of an exemplary countdown stamp algorithm implementation according to an embodiment. Each line is shown after processing.

DETAILED DESCRIPTION

A "dot" may be a dark output pixel. A "hole" may be a light output pixel. For purposes of the discussion contained herein, reference will be made to placing dots. However, the discussion herein equivalently applies to placing holes as well.

A "stored pixel value" may refer to a value that is stored in and retrieved from a memory, such as a scanline buffer memory, for a pixel. The stored pixel value may be updated based on stamping and decaying functions. If sampling and extrapolation are used, intermediate pixel values may be extrapolated from two stored pixel values. As used herein, the term "stored pixel values" includes intermediate pixel values.

A "pixel intensity value" may refer to a value representing the lightness or darkness of a pixel in an image. An error diffusion process may be used to increase or decrease an input pixel intensity value for a particular pixel based on a diffused error value. In a colored pixel embodiment, a plurality of pixel intensity values may be used, where each pixel intensity value represents the lightness or darkness of a particular color for the pixel to which the pixel intensity value pertains. Each pixel intensity value may be modified by a diffused error value corresponding to the same color.

As previously discussed, prior stamping function implementations that reduce or eliminate the occurrence of worms and/or worm holes require relatively complex and/or computationally intensive calculations to determine a threshold delta value to apply to a particular pixel. The threshold delta value may be based on a decaying function that is applied to a value for each pixel. Conventional stamping function implementations typically use a multiplication operation as a decaying function. However, multiplication operations, when implemented in hardware may be computationally intensive, memory intensive, and/or logic gate intensive.

To reduce the complexity of stamping function implementations, distance metric methods, such as those described in U.S. patent application Ser. No. 10/741,561 to Mantell, entitled "Method for Error Diffusion Employing a Stamp Field," and U.S. patent application Ser. No. 10/741,703 to Mantell, entitled "Method for Processing Color Image Data Employing a Stamp Field," each of which is incorporated herein by reference in its entirety, have been devised. A stamp field may permit the distance to previously printed dots to be determined without further calculation and without searching nearby pixels as disclosed in R. Levien, "Output Dependent Feedback in Error Diffusion Halftoning," IS&T 46th Annual Conference, Cambridge, Mass. (May 1993); G. Marcu, "Error diffusion algorithm with output position constraints for homogeneous highlight and shadow dot distribution," Journal of Electronic Imaging, vol. 9(1), pp 46-51 (January 2000); U.S. Pat. No. 5,917,614 to Levien; and U.S. Pat. No. 6,160,921 to Marcu, each of which is incorporated herein by reference in its entirety. A distance metric method may measure the distance between a particular pixel and the closest dot in the same or a previous scanline as the particular pixel. The distance may be measured, for example, using a "city-block" measure or a Euclidian measure. A city-block distance between two points $(x_1, y_1)$ and $(x_2, y_2)$ may equal $|x_1-x_2|+|y_1-y_2|$. A Euclidian distance between the same two points may equal $\sqrt{(x_1-x_2)^2+(y_1-y_2)^2}$. The Euclidian distance measure has been disclosed in R. Levien, "Output Dependent Feedback in Error Diffusion Halftoning," IS&T 46th Annual Conference, Cambridge, Mass. (May 1993); U.S. Pat. No. 5,917,614 to Levien. City-block distance methods may be computationally simpler than either Euclidian distance methods or multiplication methods.

In a typical stamp function algorithm, a threshold delta value may be assigned to each location, such as a pixel, in an array. The threshold delta value may represent an incremental value used to suppress or encourage dot placement. One disadvantage with storing threshold delta values is that such values typically have a one-to-one mapping with the number of possible pixel intensity values. Accordingly, threshold delta values include a large number of bits and thus require significant storage space within a processor-readable storage medium.

In contrast, in an embodiment, such as is shown in FIG. 9, a stored pixel value may correspond to each pixel. The stored pixel value may be a value having a smaller number of bits than the threshold delta value of conventional stamping function implementations. For example, if a threshold delta value ranges from –128 to 127, a stored pixel value may range from 0 to 31. In this manner, less storage space may be required to store pixel values for each pixel.

When a threshold delta value is determined using the countdown stamp function, the values may not be as large as those used with typical stamp functions because the values do not have to persist for many scanlines through a decaying function. One exemplary embodiment may include setting the threshold delta value to a small constant value, such as either +16 or –16 for pixels requiring a threshold delta value with light or dark input values, respectively. The above-described algorithms may work in a similar manner for input pixel intensity values near zero and near 255 with the exception that the sign of the delta threshold is reversed. Accordingly, this disclosure only describes the behavior for light values.

In an embodiment, a maximum stored pixel value may be, for example, '31,' such as is shown in FIG. 9. In such an embodiment, if the input pixel intensity value equals '1,' a pixel with a stored pixel value above '10' may receive a delta threshold of +16. If an input pixel intensity value equals '2,' a pixel with a stored pixel value above '18' may receive the delta threshold. If an input pixel intensity value equals '3,' a pixel with a stored pixel value above '20' may receive the delta threshold. In other words, as the pixel intensity value for a particular pixel increases, the stored pixel value required may increase as well until, for some input pixel intensity value below '128,' the mid-point of the input pixel intensity values, no threshold delta value may be added.

In an embodiment, the threshold delta values may smoothly approach zero. The threshold delta values may decrease for input pixel intensity values further from zero. For example, the threshold delta values for input pixel intensity values of 20 and below may be 16 and then may be reduced by 1 for each subsequent input pixel intensity value. In other words, for an input pixel intensity value of 36 or higher, the threshold delta value may be equal to zero.

In an embodiment, the threshold delta values may be reduced for lower stored pixel values. For example, for a pixel having an input pixel intensity value of '1,' the threshold delta value may be set to '16' at stored pixel values of 16 or greater and may be set to the stored pixel value for values below 16. In an embodiment, a similar threshold delta level may be set for pixels exceeding a particular breakpoint.

Pixel values may be stored in a scanline buffer memory, such as the one shown in FIG. 4. Each memory location in the scanline buffer memory may contain a pixel value for pixels in a particular pixel column. In an alternate embodiment, such as the scanline buffer memory shown in FIG. 9, less than all pixel columns in an input image may be stored in the scanline buffer memory. In this case, intermediate pixel values may be extrapolated from the pixel values stored in the scanline buffer memory. Likewise, stored pixel values may be interpolated from the updated pixel values via a sampling process prior to storage. In either case, the scanline buffer memory may only contain pixel values for a single scanline (or portions of two scanlines) at any given time. Once a pixel value has been processed, it may be stored in the scanline buffer memory for use by a subsequent scanline.

Figure 8:
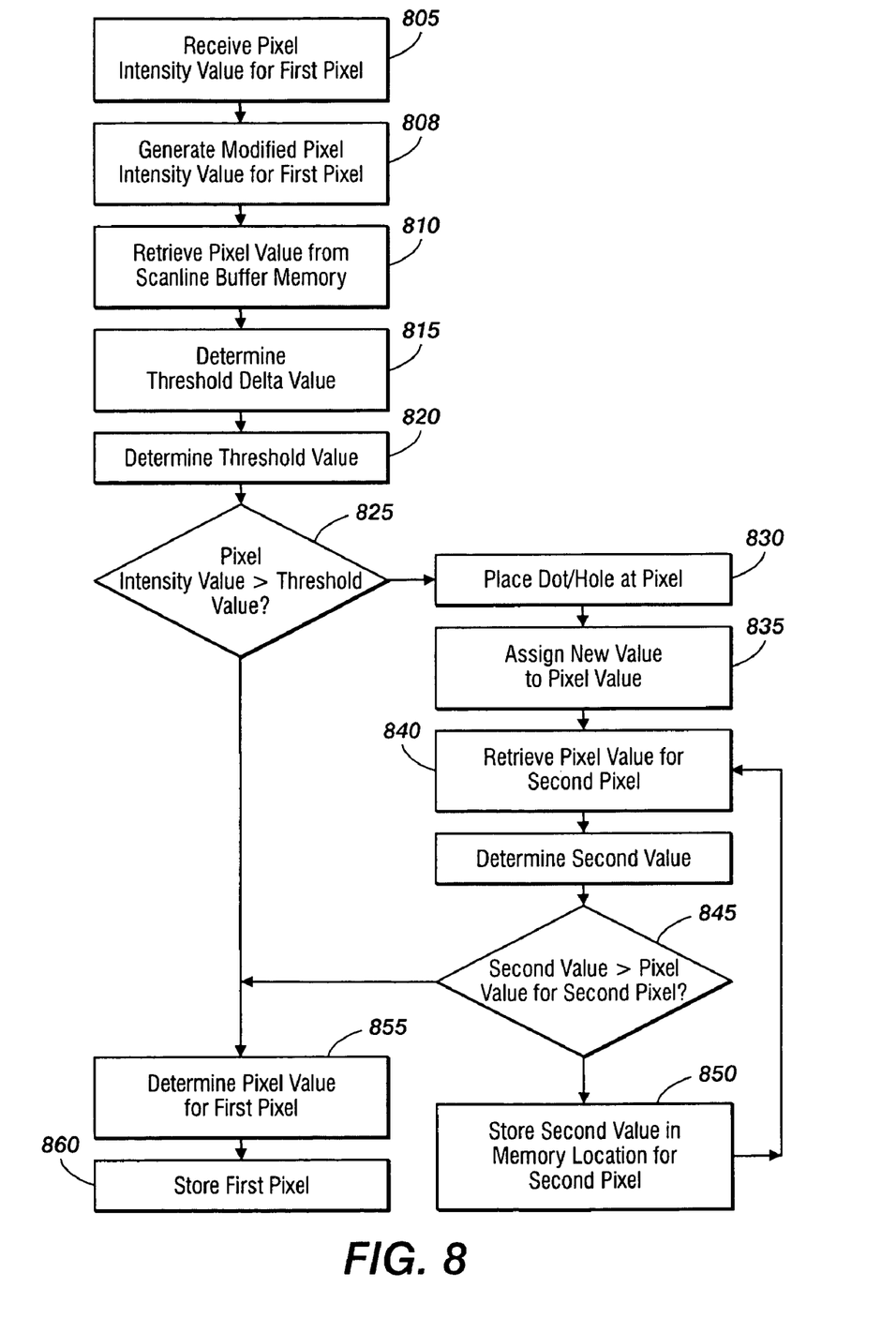
FIG. 8 depicts a flow diagram of an exemplary process for performing a stamping function according to an embodiment.

FIG. 8 depicts a flow diagram of an exemplary process for performing a stamping function according to an embodiment. As shown in FIG. 8, a pixel intensity value may be received 805 for a pixel. The pixel intensity value may represent the brightness or darkness of a pixel in an input image. The pixel intensity value may be, for example, a value from 0 to 255. The embodiment disclosed in FIG. 8 pertains to a single-color stamping function. However, the process may be replicated if pixel intensity values for more than one color are received. For example, in a system that uses cyan, yellow, magenta and black, four pixel intensity values may be received, where each pixel intensity value corresponds to one of the colors. In such an embodiment, the process may be replicated for each pixel intensity value. For some error diffusion algorithm embodiments, known in the art as vector algorithms, more than one color may be considered at a time. In such embodiments, the threshold delta values for colors evaluated together may include contributions from all of the colors. For example, the threshold delta value may equal the sum of each color that is processed concurrently.

The pixel intensity value may be modified 808 by adding one or more error values from previously processed pixels to the initial pixel intensity value. This modification 808 of the initial pixel intensity value may be performed using an error diffusion algorithm.

Upon receiving the pixel intensity value, a pixel value for the pixel may be retrieved 810 from a scanline buffer memory. The pixel value and, optionally, the pixel intensity value may be used to determine 815 a threshold delta value for the pixel. In an embodiment, a lookup table ("LUT") may be accessed to determine the threshold delta value. The LUT may contain one or more threshold delta values. Accordingly, the use of the LUT may permit the size of the scanline buffer memory storing the pixel values to be significantly smaller than a scanline buffer memory used to store threshold delta values for conventional stamping functions. In an alternate embodiment, a function may be used to determine a threshold value for the pixel. The function may receive a pixel value and/or a pixel intensity value as an input.

In an embodiment, a single threshold value may be stored. The threshold value may be applied to a particular pixel when the pixel value and/or the pixel intensity value exceed a threshold. In an alternate embodiment, a plurality of threshold values may be stored. A particular threshold value may be applied to a particular pixel when the pixel value and/or the pixel intensity value exceed a particular threshold.

In an embodiment, a non-zero threshold value may be returned only if the stored pixel value is greater than a positive number, such as 5, and zero otherwise. Selection of a positive pixel value may permit interpolation between pixels to be performed more easily. Interpolation may be performed in a manner similar to that described in U.S. patent application Ser. No. 11/172,151 to Metcalfe et al., entitled "Error Diffusion Method and Hardware Architecture," which is incorporated herein by reference in its entirety. Using interpolation to record less than all of the assigned pixel values may lower memory requirements for particular embodiments.

A threshold value may then be determined 820 by summing the threshold delta value and a base threshold value. The threshold value may be compared 825 with the modified pixel intensity value. If the modified pixel intensity value surpasses the threshold value, a dot may be placed 830 at the pixel, and the pixel value corresponding to the pixel may be assigned 835 a particular value. The same value may be assigned 835 to the pixel regardless of the pixel intensity value for the pixel. For example, as shown in FIG. 9 at the emboldened and underlined value at location (9, 1), a value, such as '31,' may be assigned to the pixel. In an alternate embodiment, the pixel value may be the same regardless of the pixel intensity value for the pixel as long as the pixel intensity value is within a pre-defined range. Alternatively, the pixel value may vary with the pixel intensity value for the pixel.

Pixel values for other pixels within the same scanline (i.e., pixels having the same 'y'-value) may also be updated. For example, the pixel values for one or more of the pixels neighboring the pixel at which the dot is placed, such as (8, 1) or (10, 1) in FIG. 9, may be retrieved 840 and compared 845 with a second value. The second value may be equal to, for example, the updated pixel value for the pixel at which the dot is placed minus a constant, such as 1. Other functions may also be used to calculate the second value and will be apparent to those of ordinary skill in the art based on the teachings of the disclosed embodiments.

In an embodiment, if the second value is greater than the retrieved pixel value, the second value may be stored 850 in the memory location for the retrieved pixel. The retrieval, comparison and storing steps may then be performed again using another pixel value. In an embodiment, the pixel value may correspond to a pixel location neighboring the previously retrieved pixel. If the second value is not greater than the retrieved pixel value, the updated pixel value for the pixel at which the dot is placed may be decremented 855 by, for example, a constant, such as 1, and stored 860 in the scanline buffer memory.

Referring back to the comparison at 825, if the pixel intensity value does not surpass the threshold value, the pixel value may be decremented 855 by, for example, a constant, such as 1, and stored 860 in the scanline buffer memory. In an embodiment, if the pixel value is equal to zero, it may not be decremented. Functions other than decrementing may be applied at 855 to determine the pixel value for the next scanline. Such functions will be apparent to those of ordinary skill in the art based on the teachings of the disclosed embodiments.

As shown in FIG. 9, assigned pixel values may linearly decrease away from stamped pixels within the same scanline (e.g., locations having the same 'y' value). For example, each of the underlined values in the rows y=1, y=12 and y=18 having a 'x' value greater than the location at which the pixel is stamped may be assigned values similar to values assigned by a conventional stamp function (i.e., the values may decrease away from the stamped location). In an embodiment, for pixels having values of 'x' less than the stamped pixel location, assigned pixel values may be assigned for the next row if the stored pixel values in the current row have already been decremented or decayed. It may also be possible to decay the pixels in the y direction at the time the pixels are used to avoid decaying pixels at which the value will be replaced due to printing a nearby dot on the same scanline. In the slow path direction (i.e., as 'y' increases in FIG. 9), the assigned pixel values may decrease, such as in a linear fashion. Accordingly, a distance measure may be emulated from the stamped pixel location to pixels in the same and subsequent scanlines. The values shown in FIG. 9 may represent stored pixel values after processing each scanline since one or more of the values may be replaced during the processing of a line.

As described above, in an embodiment, stored pixel values may not be summed. For example, stored pixel values for each pixel may be set to the larger of the second value, if it is determined, and the pixel value stored in the scanline buffer memory for the pixel. For example, the pixel value at location (9, 12) in FIG. 9 may be determined by, for example, decrementing the value at (8, 12) during the decaying function performed in 855. In contrast, the pixel value at location (10, 12) may be assigned, via 850, based on the second value determined as a result of a dot being placed at the subsequently processed location (21, 12). The new value may replace a value of '19' which was used when processing the pixel (10, 12). The new value may be decayed and used to determine the value at location (10, 13).

In an alternate embodiment, interpolation and extrapolation may be used to reduce the number of pixel values stored in the scanline buffer memory. A first pixel value and a second pixel value may be retrieved from a scanline buffer memory. One or more intermediate pixel values may be determined using upscaling logic, such as is described below in reference to FIG. 10. The intermediate pixel values may be updated if a dot is placed in a pixel. After updating a plurality of pixel values including intermediate pixel values, a group of pixel values may be downscaled by averaging the pixel values and selecting particular averaged values to store as pixel values in the scanline buffer memory. The downscaling and selection processes are described below in reference to FIG. 11. Equivalent methods of upscaling and downscaling may also be performed within the scope of this disclosure and will be readily apparent to those of ordinary skill in the art.

Figure 10:
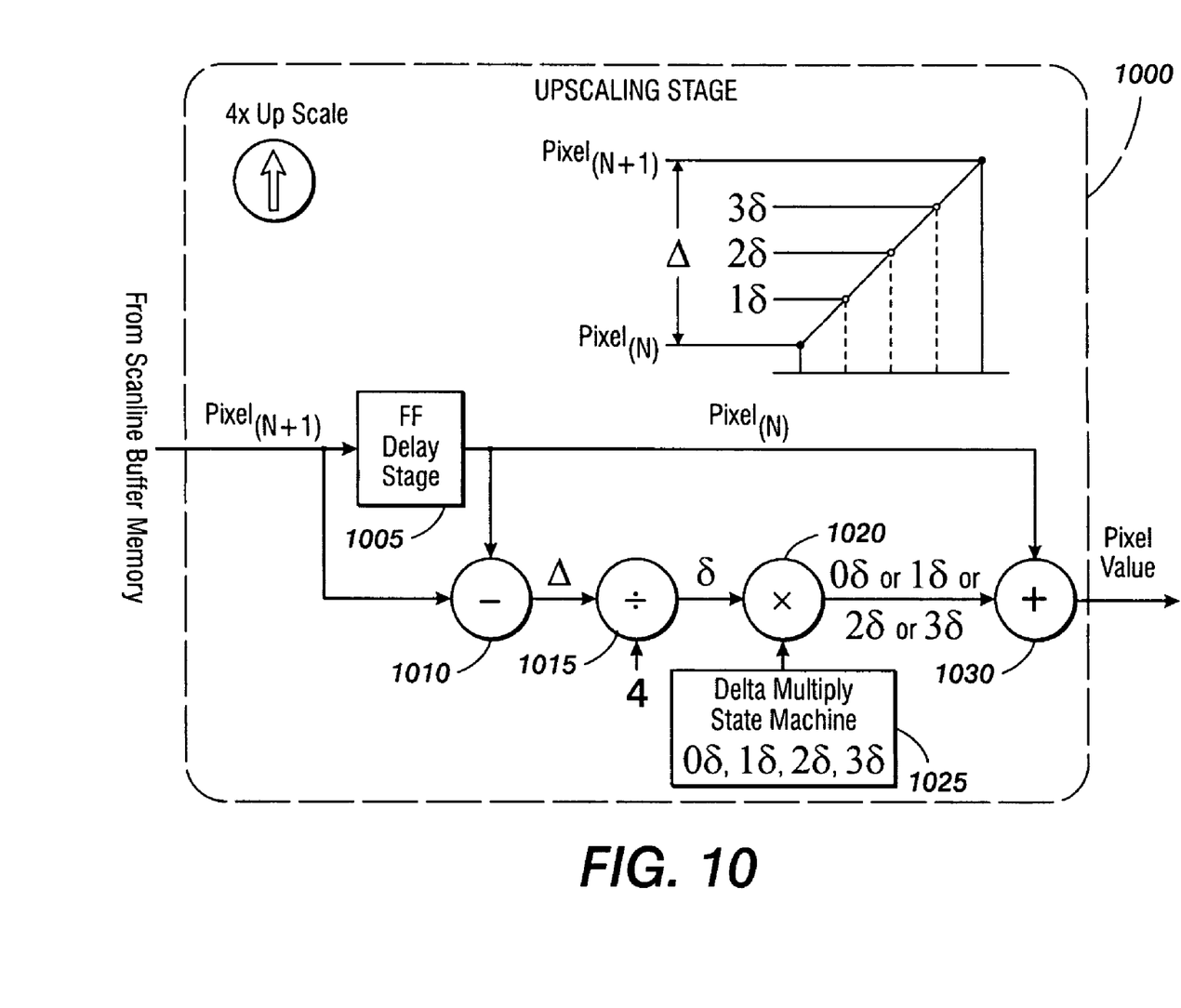
FIG. 10 depicts an exemplary upscaling logic diagram according to an embodiment.

FIG. 10 depicts an exemplary upscaling logic diagram according to an embodiment. The pixel upscaling logic 1000 may use linear interpolation to generate intermediate pixel values based on the received pixel value from the scanline buffer memory prior to determining whether to place dots at the pixels. As shown in FIG. 10, the pixel upscaling logic 1000 may include a register 1005, a subtractor circuit 1010, a divider circuit 1015, a multiplier circuit 1020, a state machine 1025 and an adder circuit 1030. The upscaling logic may be implemented in, for example, a xerographic apparatus, a scanner, a printer, a copier, a facsimile machine, or any other device that reproduces, loads, outputs and/or stores images.

In an embodiment, the register 1005 may be used to determine the pixel value stored in memory location N and memory location N+1. A new pixel value may be loaded into the register 1005 when previous updated pixel values have been processed. A scaling factor may correspond to the size reduction of the scanline buffer memory as compared to such memories used in conventional stamping functions.

The subtractor circuit 1010 may compute the difference between the pixel value stored in memory location N and the pixel value stored in memory location N+1. This may be termed the delta value ($\Delta$) between the two pixel values. The divider circuit 1015 may then be used to divide $\Delta$ by the scaling factor (e.g., four) to determine an interpolation factor ($\delta$). The state machine 1025 may cycle through the numbers 0, 1, 2 and 3 as constants to be used by the multiplier circuit 1020 in calculating products with $\delta$. In an embodiment, the number 0 may be used in the cycle in which the register 1005 accepts a new pixel value. The output of the multiplier circuit 1020 may thus be the values $\{0, \delta, 2\delta, 3\delta\}$. Similarly, the adder circuit 1030 may output the values $\{Pixel_N, Pixel_N+\delta, Pixel_N+2\delta, Pixel_N+3\delta\}$. In this manner, the pixel upscaling logic 1000 may output a number of pixel values equal to the scaling factor for each pixel value read from the scanline buffer memory. Alternate scaling factors may be used within the scope of the present disclosure.

Figure 11:
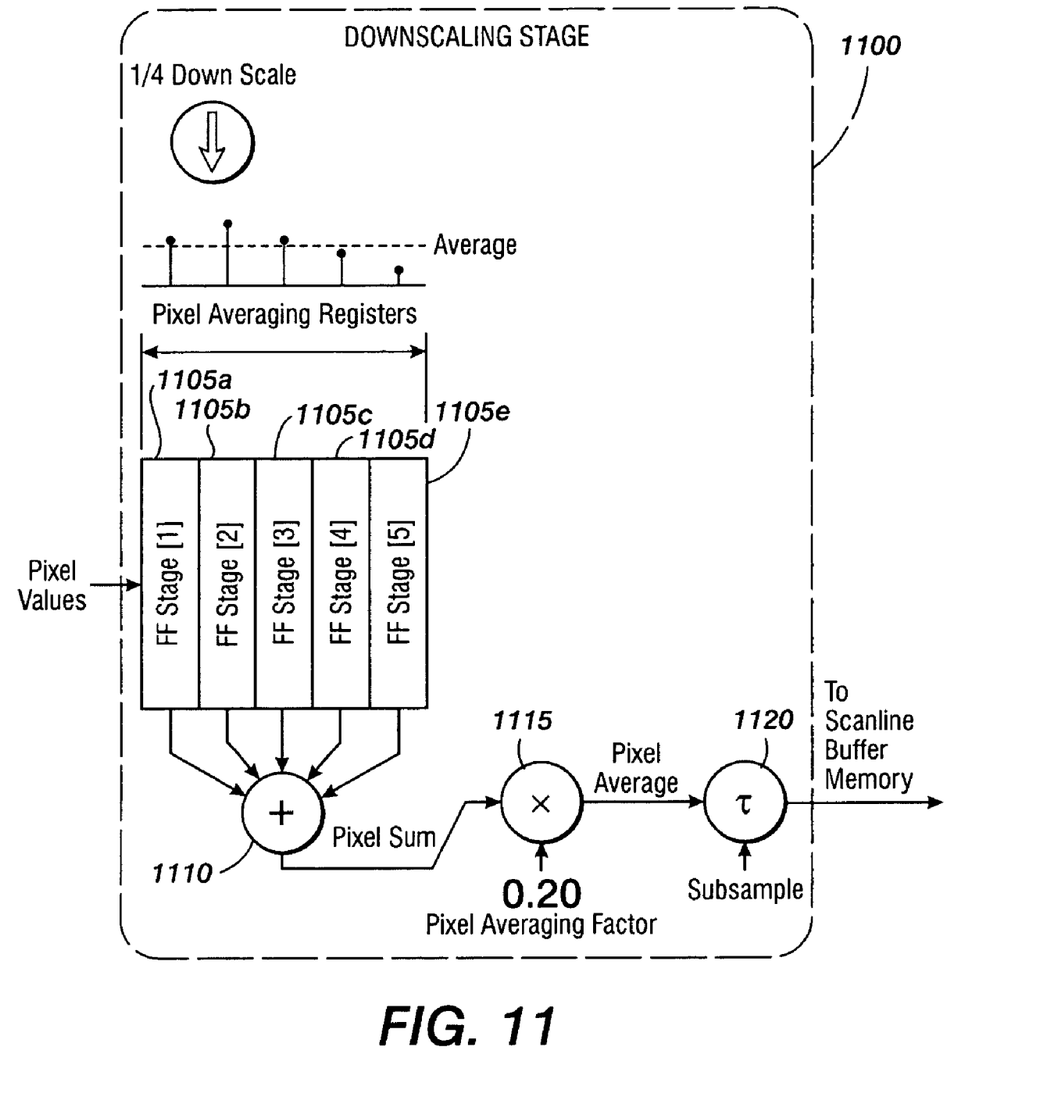
FIG. 11 depicts an exemplary downscaling logic diagram according to an embodiment.

FIG. 11 depicts an exemplary downscaling logic diagram according to an embodiment. As shown in FIG. 11, the pixel downscaling logic 1100 may include, for example, five pixel averaging registers 1105*a-e*, an adder circuit 1110, a pixel averaging multiplier 1115 and a sampling circuit 1120. In an embodiment, the number of pixel averaging registers 1105 may be equal to the scaling factor plus one. The downscaling logic may be implemented in, for example, a xerographic apparatus, a scanner, a printer, a copier, a facsimile machine, or any other device that reproduces, loads, outputs and/or stores images.

The pixel downscaling logic 1100 may receive updated pixel values. The pixel downscaling logic 1100 may sum the last (scaling factor+1) updated pixel values, stored in the registers 1105*a-e*, using the adder circuit 1110. The average value may then be determined by multiplying the sum by an averaging factor using the pixel averaging multiplier 1115. In an embodiment, the averaging factor may equal $$\frac{1}{\text{scaling factor} + 1}.$$

The output of the pixel averaging multiplier 1115 may be sampled once for every (scaling factor) updated pixel values received by the sampling circuit 1120.

In an alternate embodiment, the pixel downscaling logic 1100 may simply store one out of every (scaling factor) updated pixel values. As such, other pixel values may simply be discarded. This may be possible because intermediate pixel values may be recomputed using the decrementing function. In addition, such an embodiment may limit the computation required for each pixel.

In an embodiment, the pixel upscaling logic 1000 and the pixel downscaling logic 1100 may be synchronized to retrieve and store pixel values for the same pixel in the scanline buffer memory.

If a dot is placed at a pixel in an embodiment using pixel upscaling logic 1000 and pixel downscaling logic 1100, pixel values stored in the scanline buffer memory may be updated by decrementing as described above in reference to FIG. 8 except that values may be decremented by a value, such as the scaling factor. The particular decrementing value may depend on the proximity between the pixel at which the dot is placed and the pixel for which the pixel value is stored. In an embodiment, the values in the register 1005 of the pixel upscaling logic 1000 may also be updated based on whether a dot is placed in a presently evaluated pixel. In an embodiment using the pixel downscaling logic 1100 shown in FIG. 11, the registers 1105*a-e* may also be updated if a dot is placed in a presently evaluated pixel.

Figure 12:
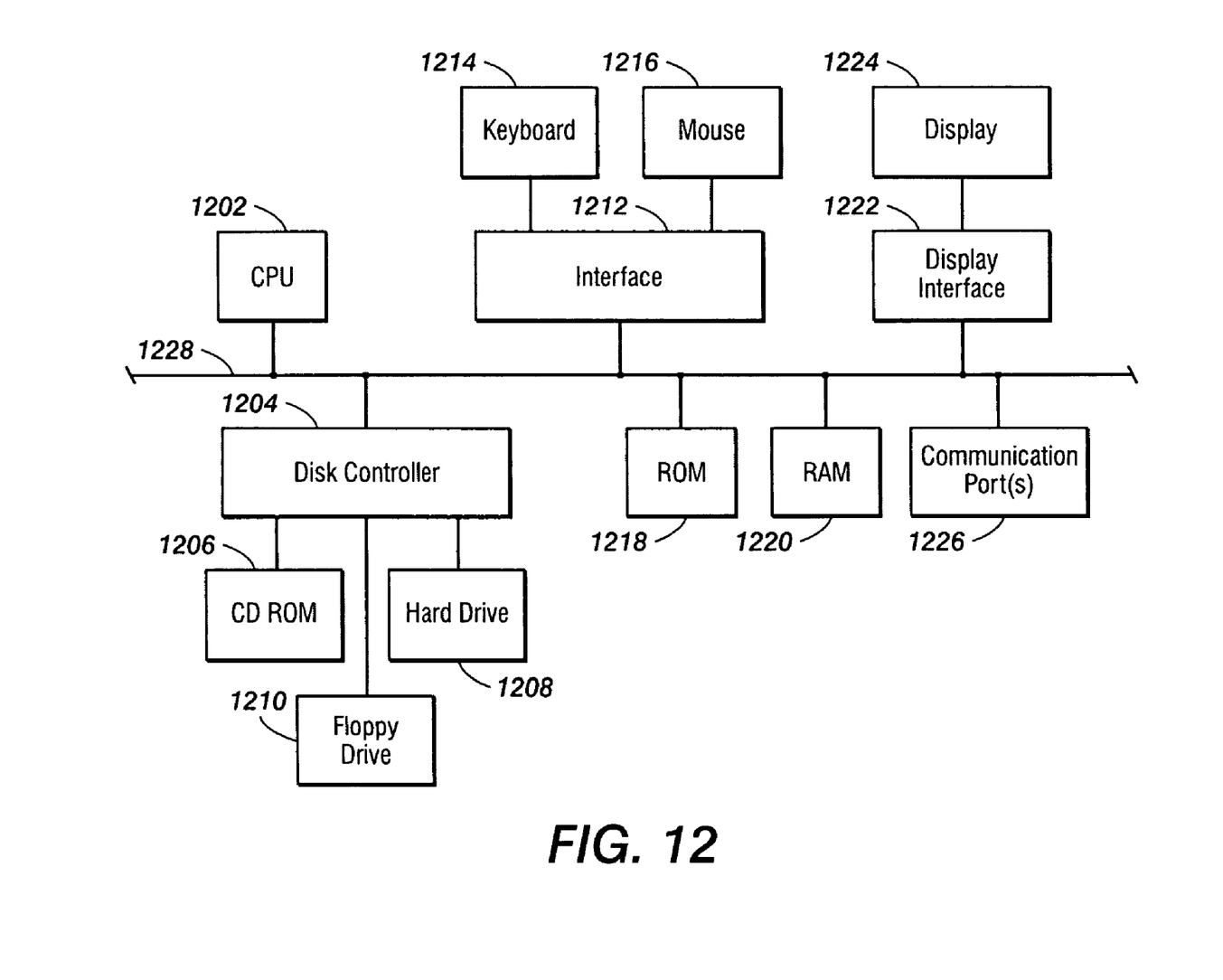
FIG. 12 is a block diagram of exemplary internal hardware that may be used to contain or implement the program instructions according to an embodiment.

FIG. 12 is a block diagram of exemplary internal hardware that may be used to contain or implement the program instructions according to an embodiment. Referring to FIG. 12, a bus 1228 may serve as a main information highway interconnecting the other illustrated components of the hardware. CPU 1202 is the central processing unit of the system, performing calculations and logic operations required to execute a program. Read only memory (ROM) 1218 and random access memory (RAM) 1220 constitute exemplary memory devices.

A disk controller 1204 interfaces with one or more optional disk drives to the system bus 1228. These disk drives may be external or internal floppy disk drives such as 1210, CD ROM drives 1206, or external or internal hard drives 1208. As indicated previously, these various disk drives and disk controllers are optional devices.

Program instructions may be stored in the ROM 1218 and/or the RAM 1220. Optionally, program instructions may be stored on a computer readable medium such as a floppy disk or a digital disk or other recording medium, a communications signal or a carrier wave.

An optional display interface 1222 may permit information from the bus 1228 to be displayed on the display 1224 in audio, graphic or alphanumeric format. Communication with external devices may optionally occur using various communication ports 1226. An exemplary communication port 1226 may be attached to a communications network, such as the Internet or an intranet.

In addition to computer-type components and their equivalents, the hardware may also include an interface 1212 which allows for receipt of data from input devices such as a keyboard 1214 or other input device 1216 such as a remote control, pointer and/or joystick.

A multiprocessor system may optionally be used to perform one, some or all of the operations described herein. Likewise, an embedded system, such as a sub-system within an image processing device, may optionally be used to perform one, some or all of the operations described herein. An image processing device may include one or more of a xerographic apparatus, a scanner, a printer, a copier, a facsimile machine, and any other device that reproduces, loads, outputs and/or stores images. A xerographic apparatus includes a device that performs a xerographic process to imprint a page.

For example, an image processing device may scan, download or otherwise receive an image in, for example, a digital format. The digital format may include one or more pixel intensity values for each pixel in the image. The pixel intensity values may be stored in a memory prior to processing or may be utilized for processing as the image is being scanned. The xerographic apparatus may use a method described above or an equivalent or similar method to determine pixel values as each pixel is processed. The pixel values may be written to a scanline buffer memory to assist the processing of subsequent scanlines. Upon completion of or during pixel processing, the resulting image may be transferred to, for example, a printing module of the xerographic apparatus, a printer, or any other device for generating a human-readable representation of the image.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An image processing device, comprising:
   a processor; and
   a computer readable memory,
   wherein the computer readable memory contains one or more programming instructions for performing a method for processing an input image to form an output image, wherein the input image includes a plurality of input pixels, wherein each input pixel includes an input pixel intensity value having a first number of possible levels representing a lightness of a pixel, wherein the output image includes a plurality of output pixels, wherein each output pixel includes an output pixel intensity value having a second number of possible levels, the method comprising:
   receiving an input pixel intensity value for an input pixel,
   determining a modified input pixel intensity value based on information pertaining to one or more second pixels,
   determining a threshold value based on at least the input pixel intensity value and a stored pixel value corresponding to the input pixel, wherein the stored pixel value is stored in a scanline buffer memory,
   determining an output pixel intensity value by comparing the modified input pixel intensity value with the threshold value,
   setting the stored pixel value corresponding to the input pixel to a first value,
   setting a decremented pixel value to the stored pixel value corresponding to the input pixel,
   selecting a previously unselected pixel,
   decrementing the decremented pixel value by a second value,
   retrieving a stored pixel value corresponding to the selected pixel,
   setting the stored pixel value corresponding to the selected pixel to the decremented pixel value in response to the decremented pixel value being greater than the stored pixel value corresponding to the selected pixel, and
   repeating the selecting, decrementing, retrieving and setting the stored pixel value corresponding to the selected pixel while the decremented pixel value is greater than both zero and the stored pixel value corresponding to the selected pixel.

2. The image processing device of claim 1 wherein determining a threshold value comprises accessing a lookup table using the input pixel intensity value and the stored pixel value for the first pixel.

3. The image processing device of claim 1 wherein determining a threshold value comprises calculating a function based on at least the input pixel intensity value and the stored pixel value for the first pixel.

4. The image processing device of claim 1 wherein selecting a previously unselected pixel comprises selecting a pixel that is adjacent to the previously selected pixel.

5. The image processing device of claim 1 wherein the computer readable memory further contains one or more programming instructions for performing the following:
   retrieving a first retrieved pixel value and a second retrieved pixel value;
   calculating a plurality of upscaled pixel values based on the first retrieved pixel value and the second retrieved pixel value; and
   setting the stored pixel value corresponding to the first pixel to an upscaled pixel value corresponding to the first pixel.

6. The image processing device of claim 1 wherein the computer readable memory further contains one or more programming instructions for performing the following:
   calculating a downscaled pixel value based on one or more of the modified stored pixel values; and
   storing the downscaled pixel value.

7. A computer readable memory containing one or more programming instructions for performing a method for processing an input image to form an output image, wherein the input image includes a plurality of input pixels, wherein each input pixel includes an input pixel intensity value having a first number of possible levels representing a lightness of a pixel, wherein the output image includes a plurality of output pixels, wherein each output pixel includes an output pixel intensity value having a second number of possible levels, the method comprising:
   receiving an input pixel intensity value for an input pixel;
   determining a modified input pixel intensity value based on information pertaining to one or more second pixels;
   determining a threshold value based on at least the input pixel intensity value and a stored pixel value corresponding to the input pixel;
   determining an output pixel intensity value by comparing the modified input pixel intensity value with the threshold value;
   setting the stored pixel value corresponding to the first pixel to a first value;
   setting a decremented pixel value to the stored pixel value corresponding to the first pixel;
   selecting a previously unselected pixel;
   decrementing the decremented pixel value by a second value;
   retrieving a stored pixel value corresponding to the selected pixel;
   setting the stored pixel value corresponding to the selected pixel to the decremented pixel value in response to the decremented pixel value being greater than the stored pixel value corresponding to the selected pixel; and
   repeating the selecting, decrementing, retrieving and setting the stored pixel value corresponding to the selected pixel while the decremented pixel value is greater than both zero and the stored pixel value corresponding to the selected pixel.

8. The computer readable memory of claim 7 wherein determining a threshold value comprises accessing a lookup table using the input pixel intensity value and the stored pixel value for the first pixel.

9. The computer readable memory of claim 7 wherein determining a threshold value comprises calculating a function based on at least the input pixel intensity value and the stored pixel value for the first pixel.

10. The computer readable memory of claim 7 wherein selecting a previously unselected pixel comprises selecting a pixel that is adjacent to the previously selected pixel.

11. The computer readable memory of claim 7, further comprising one or more programming instructions for:

setting the stored pixel value corresponding to the input pixel to the stored pixel value minus a third value.

12. The computer readable memory of claim 11 wherein the second value equals the third value.

13. The computer readable memory of claim 12 wherein the second value equals one.

14. The computer readable memory of claim 7 wherein the computer readable memory further contains one or more programming instructions for performing the following:

retrieving a first retrieved pixel value and a second retrieved pixel value;

calculating a plurality of upscaled pixel values based on the first retrieved pixel value and the second retrieved pixel value; and setting the stored pixel value corresponding to the first pixel to an upscaled pixel value corresponding to the first pixel.

15. The computer readable memory of claim 7 wherein the computer readable memory further contains one or more programming instructions for performing the following:

calculating a downscaled pixel value based on one or more of the modified stored pixel values; and storing the downscaled pixel value.

\* \* \* \* \*